(12) United States Patent
Sugita

(10) Patent No.: US 6,272,500 B1
(45) Date of Patent: *Aug. 7, 2001

(54) OBJECT-ORIENTED DEVICE MANAGEMENT SYSTEM AND METHOD

(75) Inventor: Kiyoshi Sugita, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/897,168

(22) Filed: Jul. 18, 1997

(30) Foreign Application Priority Data

Dec. 10, 1996 (JP) .................................... 8-329488

(51) Int. Cl.$^7$ ...................................... G06F 17/30
(52) U.S. Cl. ..................... 707/103; 707/10; 707/102
(58) Field of Search ..................... 707/103, 100, 707/102, 10; 709/301, 303

(56) References Cited

U.S. PATENT DOCUMENTS

| | | | |
|---|---|---|---|
| 5,335,346 | * 8/1994 | Fabbio | 711/163 |
| 5,471,629 | * 11/1995 | Risch | 707/201 |
| 5,651,101 | * 7/1997 | Gotoh et al. | 7706/53 |
| 5,745,888 | * 4/1998 | Bauer et al. | 707/1 |
| 6,016,496 | * 1/2000 | Roberson | 707/103 |

FOREIGN PATENT DOCUMENTS 9-9613   1/1997   (JP) .

* cited by examiner

*Primary Examiner*—Jean R. Homere
*Assistant Examiner*—Greta L. Robinson
(74) *Attorney, Agent, or Firm*—Helfgott & Karas, P.C.

(57) ABSTRACT

A device interfacer detects asynchronously occurring changes in function attributes in a device, and transmits the change attribute data to a database system. Then, a database system writes the changes to the database in a memory or an external storage device. A change point detection unit monitors the changes in the attribute record specified in the database, and asynchronously generates events for an object management software or the device interfacer corresponding to a change when any change occurs in the attribute record.

11 Claims, 11 Drawing Sheets

OBJECT-ORIENTED DEVICE MANAGEMENT SYSTEM AND METHOD

BACKGROUND OF THE INVENTION

1. Field of the Invention

The present invention relates to an object-oriented device management technology for integrating external interfaces regardless of the difference among devices by managing the devices in function attributes assigned to the devices to be managed.

2. Description of the Related Art

Recently, with an increasing number of vendors of various devices such as communications devices, information processing devices, etc. and with an increasing number of variations of functions, there has been a movement to integrate user interfaces when the devices are managed, and to market device management application software for management of many kinds of devices having the same function. The management systems are referred to as object-oriented device management systems.

Conventionally, management software has been prepared for each type and vendor of a device, and a management system user can manage a device by accessing the device through the management software. The management software requires a device interface function of exchanging necessary management information by accessing a device, and a user interface function of exchanging necessary management information with users. However, developing such management software for each device requires a long time and intensive work, and costs to run the device management system are high. Additionally, the management system user has been forced to master the usage of the management software for each device.

With the above described object-oriented device management system, the user interface function in the management software is standardized and common management software (hereinafter referred to as object-oriented management software) is prepared for devices grouped in management functions. That is, when each device is managed in functions of a package, package object management software is prepared. The package object management software commonly manages the attributes of each device such as a package name, a product lot number, a failure state, etc., and provides a user with an interface for accessing the attributes. The device interface function of retrieving a necessary attribute from these attributes or setting it in a device is provided by the software referred to as a device interfacer other than the package object management software. The package object management software obtains or sets for a device an attribute required for management by communicating with a device interfacer. Furthermore, if plural kinds of line terminating equipment for a switching unit are managed from a terminating point function, a terminating point object management software is prepared. The terminating point object management software manages the attributes indicating, for example, whether or not a communications alarm is issued in each line terminating equipment, etc. and provides a user with an interface for accessing the attributes. The device interface function for obtaining the attributes from the line terminating equipment is provided by the above described device interfacer. The terminating point object management software obtains the above described attributes from the line terminating equipment by communicating with the device interfacer.

Thus, with the object-oriented device management system, the device interface function specific to each device is encapsulated by a device interfacer prepared for each device, and the object management software having the user interface function can obtain or set a device an attribute required for management by accessing a device interfacer of each device using the identical protocol. As a result, the object management software can be shared among a plurality of vendors and plural types of devices. Therefore, when a management system is provided for a unit, the vendor has only to develop a device interfacer corresponding to the device, and the user interface function can be provided by general-purpose object management software. Thus, a device management system can be developed with reduced effort within a shorter time and at a lower cost. Since a management user is provided with common user interface classified by management functions regardless of the type of device, it becomes easier to learn the usage of the management software for each device.

FIG. 1 shows the configuration of the system device according to the conventional object-oriented device management system.

In FIG. 1, a group of object management software (object management software group) 101 is an application group where each application is used to manage each function of a device 103. The object management software 101 accesses a database system 104 according to the message or command transmitted from an operating system (Ops) 105, which is running in a work station, etc. of a management user, through a Q interface 108. It also accesses the device 103 through a device interfacer 102. The Q interface 108 is a standard interface in which a standard communications protocol CMISE from the International Organization for Standardization (IOS) is adopted. The CMISE protocol is located in both presentation and application layers in the OSI reference model (a model in which layered functions associated with the communications prescribed by the international standard of network architecture 'Open System Interconnection' are defined). In this protocol, for example, a request for and a response to the management information for the device 103 to be managed (the target) are performed as abstracted services such as an M_GET service, an M_SET service, an M_ACTION service, an M_EVENT-REPORT service, etc.

The device interfacer 102 provides a user with a device interface function specific to the device 103, for obtaining/sending a necessary attribute for management from/to the device 103, and provides an interface 109 common among the devices 103 for the object management software 101 by encapsulating the difference in access system for each device 103. In this case, the communications of a message between the object management software 101 and the device interfacer 102 are established by a message passing system which is one of the inter-process or inter-object communications systems. In this system, a message is transmitted by establishing a communications channel between a transmitting process (object) and a receiving process (object).

The database system 104 accesses the database stored in memory 106 or an external storage device 107 at a request from the object management software 101. The database stores what is obtained without directly accessing the device 103 among the function attributes relating to the device 103.

Thus, the function attributes managed by the object management software 101 include the data (device name, etc.) stored in the memory 106 or external storage device 107 managed by the database system 104, and the data (error state, etc.) stored in the device 103 itself. In the following explanation, the former function attribute is referred to as an A-type attribute while the latter function attribute is referred to as a B-type attribute.

As described above, the CMISE protocol performs, for example, the request for and the response to the management information for the device 103 as an abstracted service such as an M_GET service, an M_SET service, an M_ACTION service, an M_EVENT-REPORT service, etc.

An M_GET service is used when a specified condition is transmitted from a management user to receive in return the function attribute of the corresponding device 103 to be managed. An M_SET service is used when a specified condition is transmitted from a management user to alter the function attributes of the corresponding device 103 to be managed. These M_GET service and M_SET service belong to either the above described A-type attribute or B-type attribute as shown in FIGS. 2 and 3.

As shown in FIG. 2, if the message specifying the M_GET service or M_SET service transmitted from the Ops 105 to the object management software 101 through the Q interface 108 belongs to the A-type attribute, then the object management software 101 is required to issue a read or write command corresponding to the message to the database system 104. Thus, the database system 104 accesses the database in the memory 106 or external storage device 107.

On the other hand, as shown in FIG. 3, if the message specifying the M_GET service or M_SET service transmitted from the Ops 105 to the object management software 101 through the Q interface 108 belongs to the B-type attribute, then the object management software 101 is required to issue an m_get message or m_set message corresponding to the message to the device interfacer 102 corresponding to the device 103 to be managed. The device interfacer 102 issues a read or write command corresponding to the message to the device 103 to be managed.

Next, an M_ACTION service is used when a specified condition is transmitted from a management user to perform a corresponding action defined in the device 103 to be managed. As shown in FIG. 4, if an M_ACTION service message is transmitted from the Ops 105 to the object management software 101 through the Q interface 108, then the object management software 101 issues an m_action message corresponding to the transmitted message to the device interfacer 102 corresponding to the device 103. The device interfacer 102 controls the device 103 to be managed according to the contents of the control stored in the m_action message.

An M_EVENT-REPORT service is used when issuing an asynchronous state notification from an object to be managed. As shown in FIG. 5, when an asynchronous state notification is issued by the device 103, the notification is first transmitted to the device interfacer 102. Upon receipt of the notification, the device interfacer 102 generates a corresponding m_event_report message, and transmits it to the object management software 101. The object management software 101 generates a message of an M_EVENT-REPORT service corresponding to the received message, and transmits it to the Ops 105.

The following problems are pointed out with the above described conventional object-oriented device management system.

The first problem is that the interface 109 which is required between the object management software 101 and the device interfacer 102 according to the types and contents of the services requested by the Ops 105 should be individually specified. This complicates the interface 109 with the increasing number of service types to obtain satisfactory contents of services, thereby generating complicated processes of the object management software 101 and the device interfacer 102. That is, as shown in FIGS. 2 through 5, the interface prescriptions of the m_get message, m_set message, and m_action message are required respectively corresponding to the M_GET service, M_SET service, and M_ACTION service requested by the Ops 105. Further detailed interface specifications are required depending on the contents of the respective services.

The second problem is that the program structure of the object management software 101 is complicated because the object management software 101 has to determine the type of the attribute to be managed and switch the source of the service between the database system 104 and the device interfacer 102. That is, as shown in FIGS. 2 and 3, the read command should be issued to the database system 104 when, for example, data of an A-type attribute is read in response to the M_GET service, and the m_get message should be issued to the device interfacer 102 when data of a B-type attribute is read.

SUMMARY OF THE INVENTION

The present invention has been developed based on the above described background, and aims at reducing the effort, shortening the time, and reducing the cost required to develop an object-oriented device management system by simplifying interfaces in the object management software and in the device interfacer.

The present invention is based on the object-oriented device management system for managing a device to be managed in units of function attributes corresponding to the device to be managed.

First, a database unit (a database system 604 and a database 1001) stores a function attribute corresponding to a device to be managed as an attribute record.

Then, an object management unit (an object management software 601) instructs the database unit to operate on an attribute record based on an instruction (for example, M_GET service, etc.) from a user interface or based on the occurrence of an event in which the object management unit itself is a target.

The device interfacer unit (a device interfacer 602) also instructs the database unit to process an attribute record based on a change in state of the device to be managed or an occurrence of an event in which the device interfacer unit itself is a target.

Then, a change point detection unit (a change point detection unit 609) monitors changes in a predetermined attribute record stored in the database unit. When a change is detected, an event in which the object management unit or the device interfacer unit is a target occurs. In this case, for example, an attribute record corresponds to event information (an event ID), and the change point detection unit determines an attribute record to be monitored in the database unit according to the event information. When an attribute monitored by the change point detection unit indicates a change, the change point detection unit selects the object management unit or the device interfacer unit as a target of an event corresponding to the event information associated with the changed attribute record, and determines the contents of the event according to the event information associated with the changed attribute record.

With the above described configuration of the present invention, the attribute record is associated with access control information (a write permission ID). According to the access control information associated with the attribute record, the database unit controls the access to the attribute record whose operation is designated by the object management unit or the device interfacer unit. The access control information can contain not only the write permission, but also a read permission, a delete permission, etc.

With the above described configuration of the present invention, the device interfacer unit detects asynchronously occurring changes in function attributes in a device to be managed and stores all data of a changed attribute in the database unit. Thus, all function attributes can be centrally managed by the database unit.

If the change point detection unit monitors changes in predetermined attribute records in the database based on, for example, event information associated with the records, and detects a change in any of the attribute records, it can asynchronously generate events for the object management unit or the device interfacer unit corresponding to the change. Thus, the object management unit can control the device interfacer unit through the database unit at a request to control a device to be managed from the user interface. The device interfacer unit can send an asynchronous notification to the object management unit through the database unit when a device warning, etc. is issued from a device to be managed.

Furthermore, adding access control information for use in controlling access to each access attribute record prevents the attribute record controlled by each object management unit or the device interfacer unit from being accessed by other object management units and device interfacer units according to the present invention. Thus, the independence and security of an attribute of each device to be managed can be improved.

According to the above described three characteristics of the present invention, the interface between an object management unit and a device interfacer unit can be realized as an accessing operation (read/write) to a database unit, thereby considerably simplifying the interfacing function in each of the object management unit and the device interfacer unit. As a result, the effort, time, and cost can be reduced in developing an object-oriented device management system.

BRIEF DESCRIPTION OF THE DRAWINGS

Other objects and features of the present invention can be easily recognized by one of ordinary skill in the art by referring to the attached drawings and the descriptions of the preferred embodiment of the present invention.

DESCRIPTION OF THE PREFERRED EMBODIMENT

The preferred embodiment is described below in detail by referring to the attached drawings.

Figure 6:
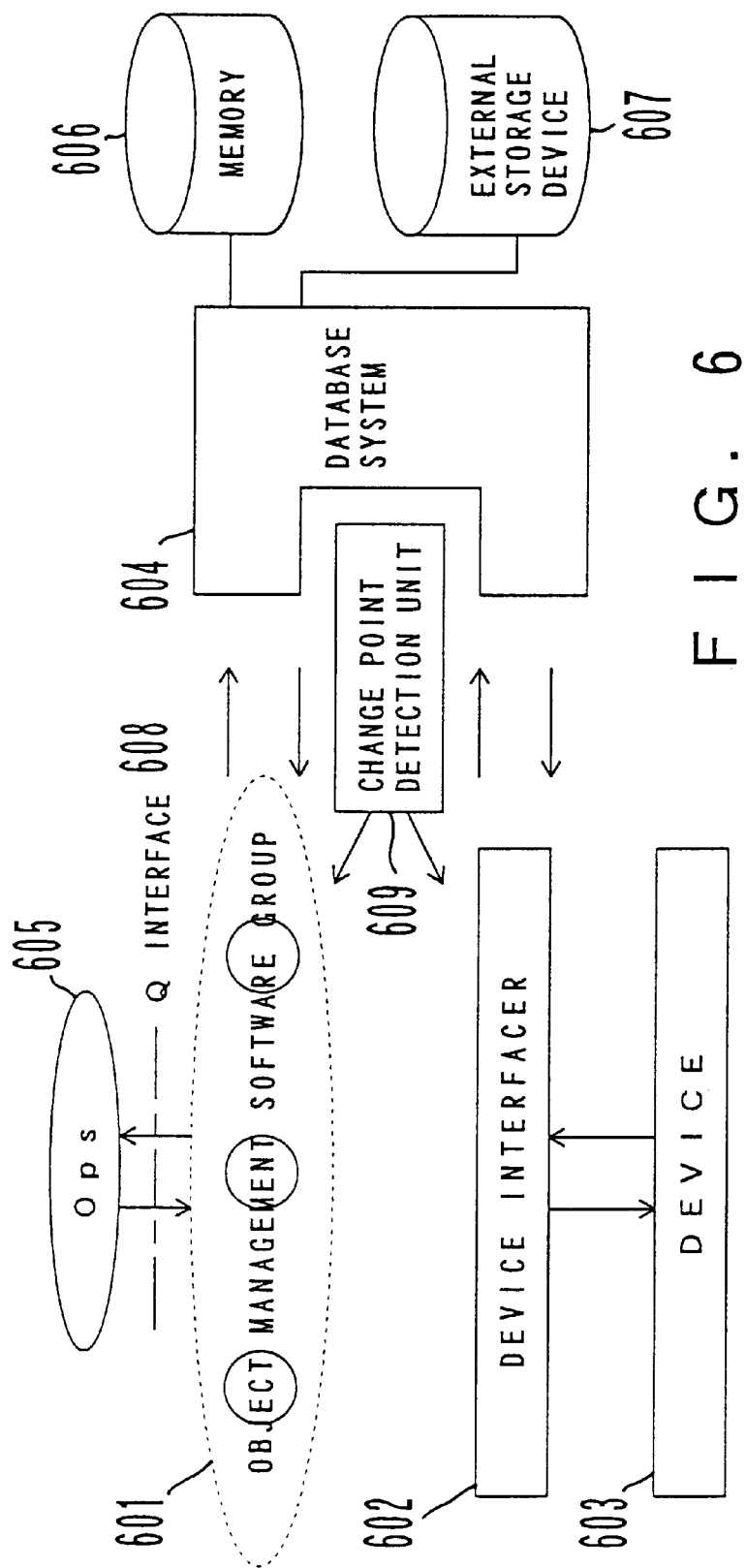
FIG. 6 shows the configuration of the preferred embodiment of the present invention.

FIG. 6 shows the configuration of the preferred embodiment of the present invention.

The first feature of the preferred embodiment of the present invention is that the device interfacer 602 detects changes in function attributes asynchronously occurring in a device 603, and transmits changed attribute data to the database system 604, and that the database system 604 writes the data to the database in a memory 606 or an external storage device 607. Thus, the database system 604 centrally manages all function attributes.

The second feature of the preferred embodiment of the present invention is that the change point detection unit 609 monitors changes in attribute records specified in a database as an auxiliary function of the database system 604. When it detects a change in any of the attribute records, it can asynchronously send events to the object management software 601 or the device interfacer 602 corresponding to the change. Thus, the object management software 601 can control the device interfacer 602 through the database system 604 in response to a request to control a device such as an M_ACTION service from an Ops 605. The device interfacer 602 can issue an asynchronous notification to the object management software 601 through the database system 604 when a device warning, etc. is issued from the device 603.

Furthermore, the third feature of the preferred embodiment of the present invention is, as a function of the database system 604, adding to each attribute record an identifier indicating a write permission to the attribute record prevents the attribute record controlled by each object management software 601 or device interfacer 602 from being accessed by other object management software 601 or device interfacers 602, thereby improving the independence and security of the attributes for each device 603.

The above described three features of the preferred embodiment of the present invention enable the interface between the object management software 601 and the device interfacer 602 to access (read/write) the database system 604, thereby remarkably simplifying the interfacing function in each of the object management software 601 and the device interfacer 602. As described above, the interface 109 has been complicated in the conventional technology because the assembly/disassembly of the message frame communicated between the object management software 101 and the device interfacer 102, the function of identifying the command and data in the message frame format for each service, etc., are required. According to the present embodiment, the above described simplified interface reduces the effort, shortens the time, and reduces the cost required to develop an object-oriented device management system.

Figure 7:
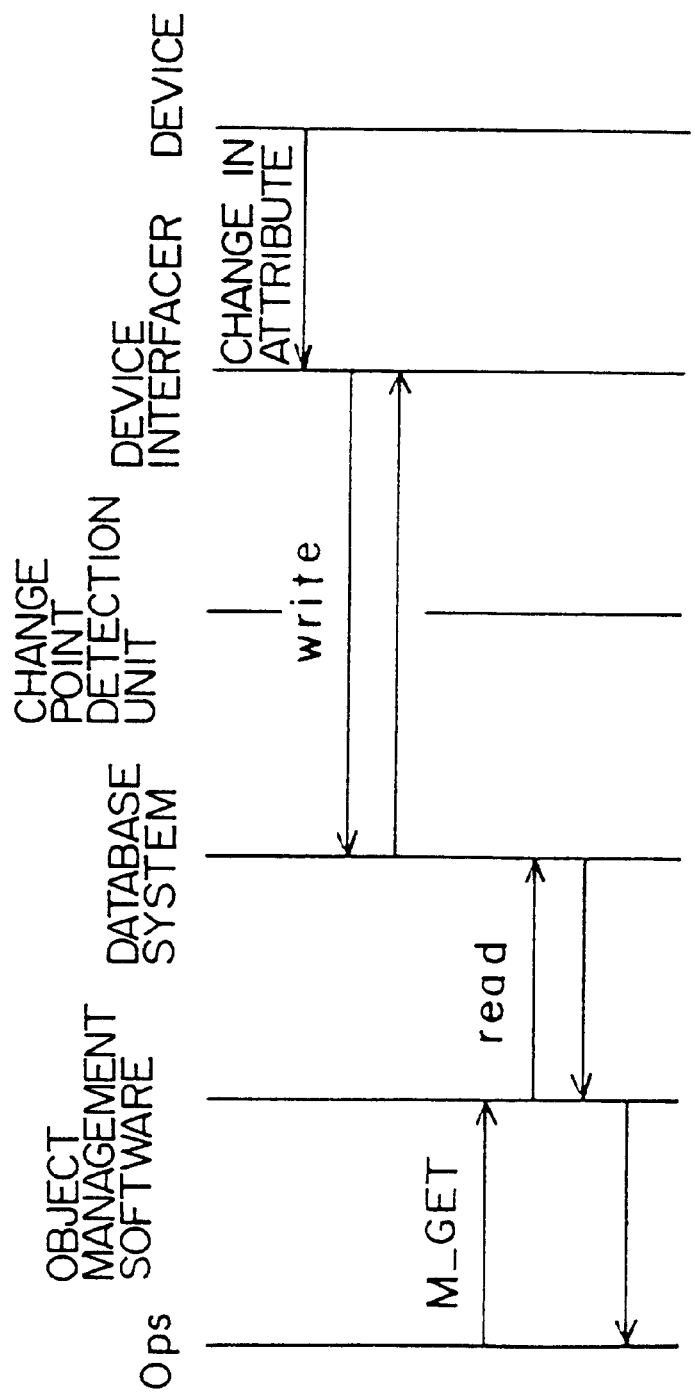
FIG. 7 shows the sequence of the operations of the preferred embodiment of the present invention (reading)
Figure 8:
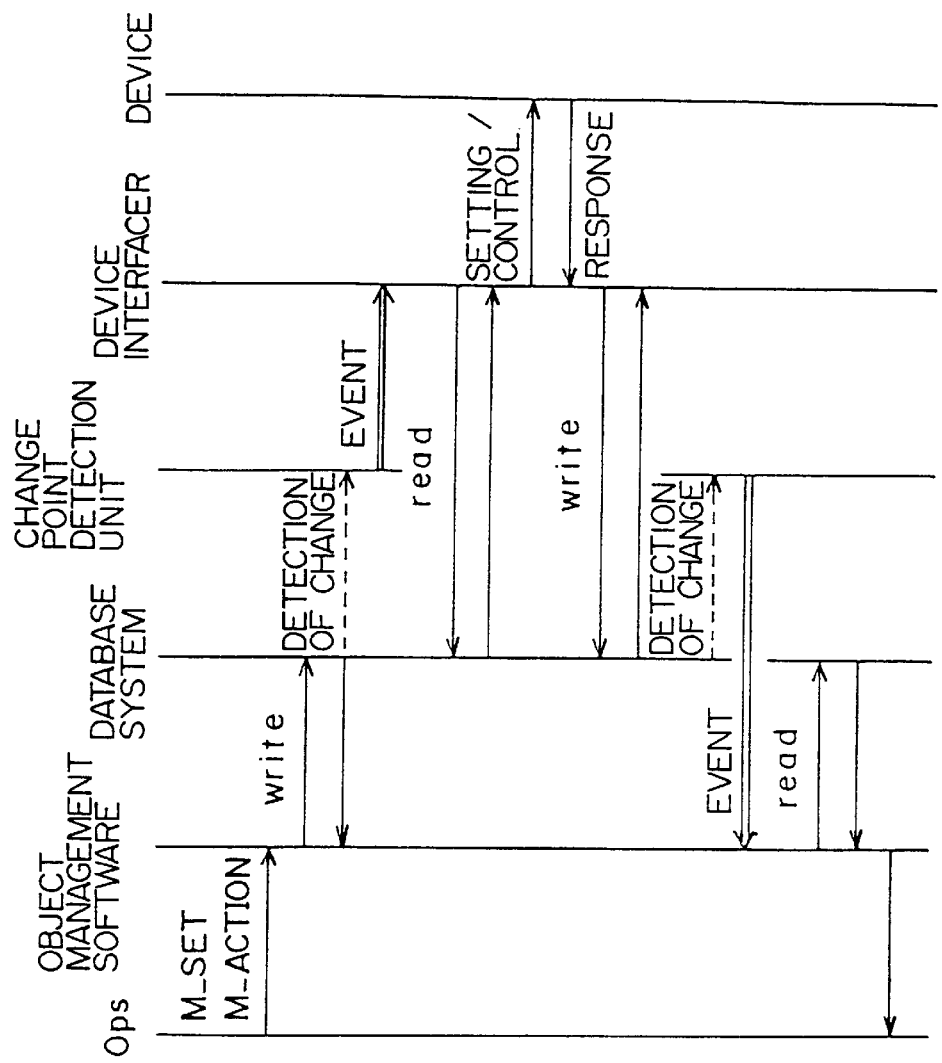
FIG. 8 shows the sequence of the operations of the preferred embodiment of the present invention (setting and controlling the device)
Figure 9:
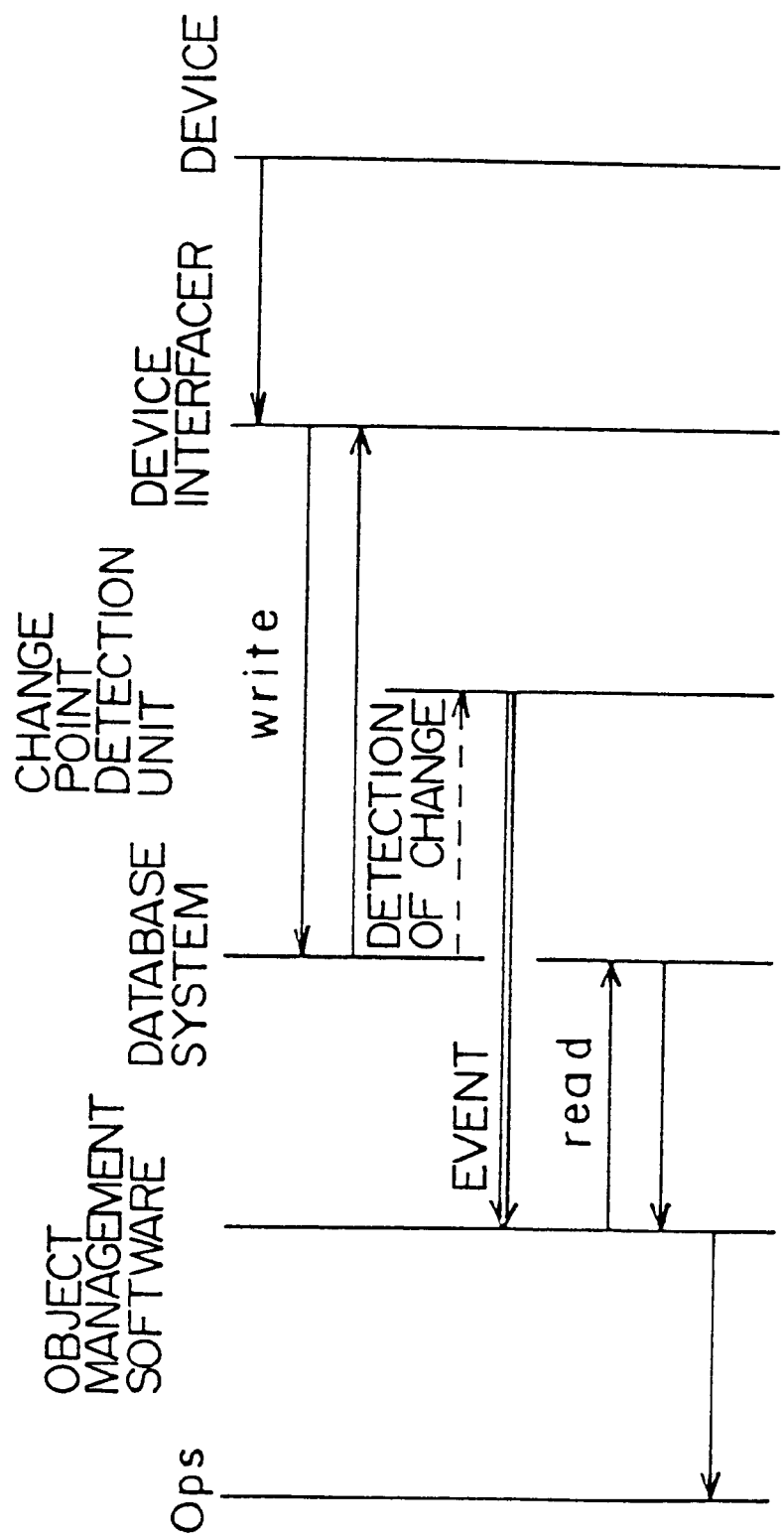
FIG. 9 shows the sequence of the operations of the preferred embodiment of the present invention (an asynchronous notification from the device)

FIGS. 7 through 9 shows the sequence of the operations according to the present embodiment based on the configuration shown in FIG. 6.

When a message of the M_GET service is transmitted from the Ops 605 to the object management software 601 through a Q interface 608 as shown in FIG. 7, the object management software 601 issues a read command to the database system 604. The read command defines as targets the instance and the attribute record corresponding to the message of the above described M_GET service in the database stored in the memory 606 or the external storage device 607 managed by the database system 604. The database system 604 reads the above described attribute record in response to the read command, and returns it to the object management software 601.

At this time, if the function attribute of the device 603 has changed before the read command is issued, the device interfacer 602 issues a write command to the database system 604 as shown in FIG. 7. Thus, the attribute record in the instance corresponding to the change is updated.

Figure 1:
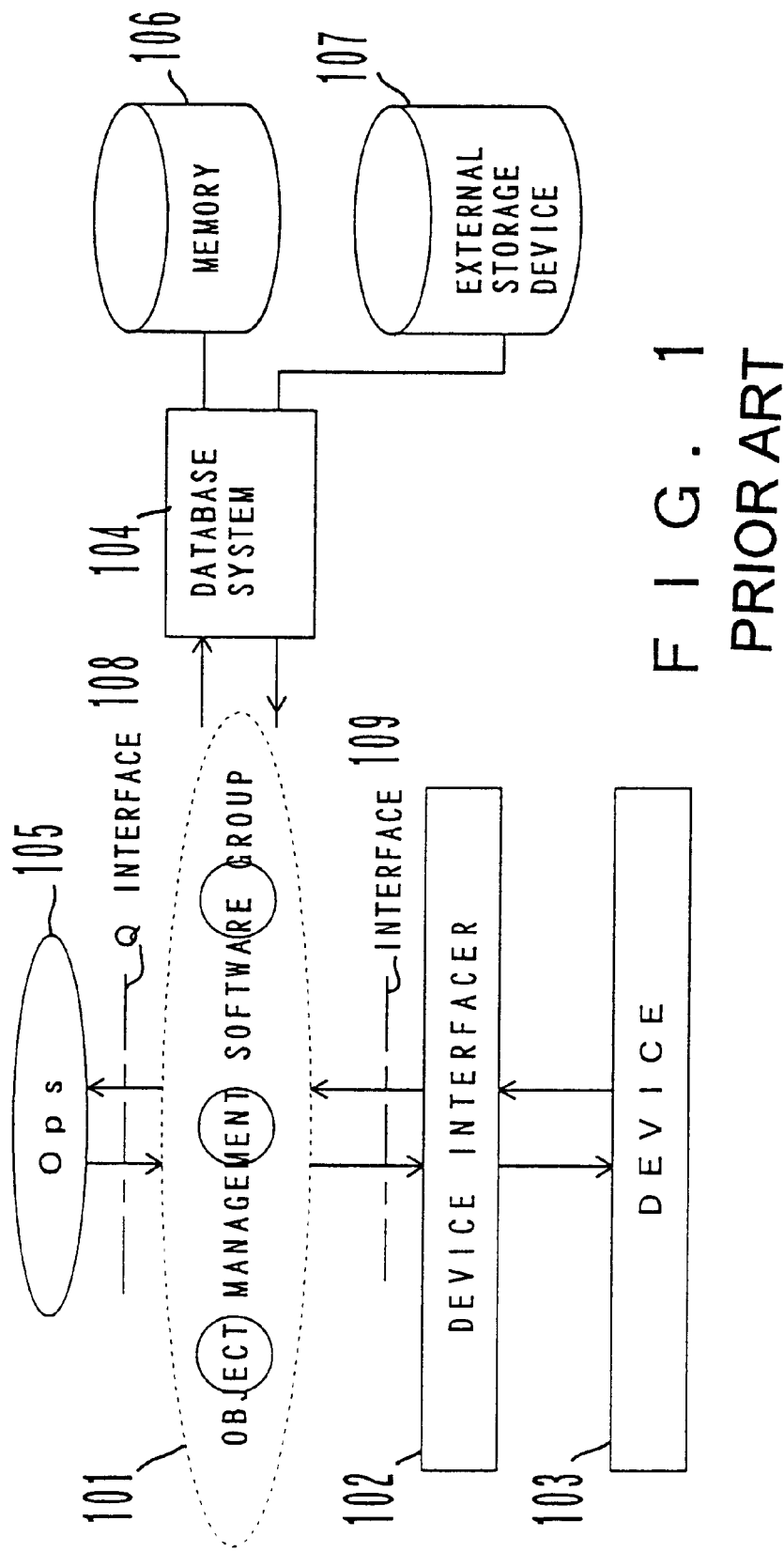
FIG. 1 shows the configuration of the prior art.
Figure 2:
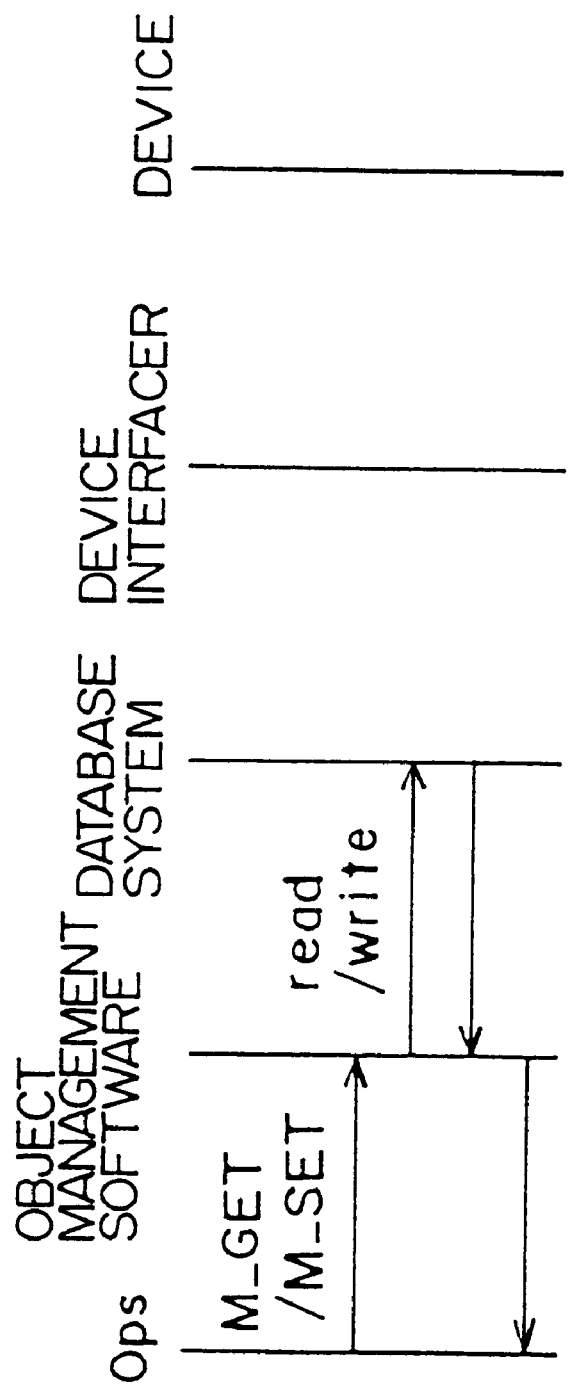
FIG. 2 shows the sequence of the operations of the prior art (reading/setting the A-type attribute)
Figure 3:
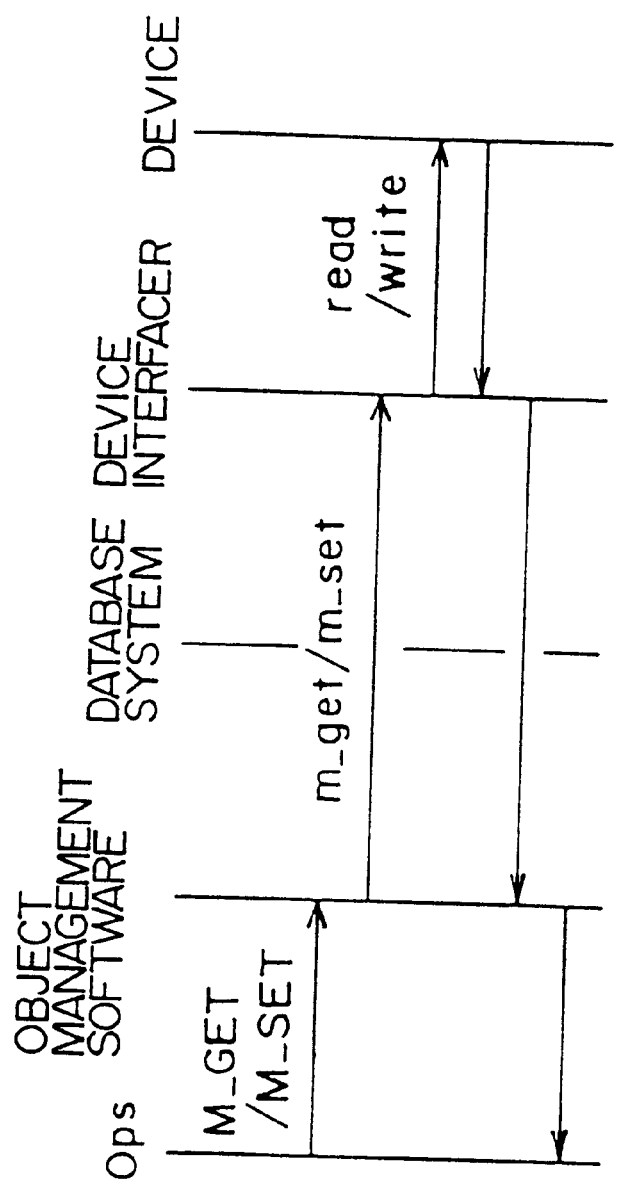
FIG. 3 shows the sequence of the operations of the prior art (reading/setting the B-type attribute)

As a result, the object management software 601 only has to issue a simple read command to the database system 604 when the above described A-type attribute data or B-type attribute data is required without a direct interface (the m_get message shown in FIG. 3) between the object management software 601 and the device interfacer 602.

Next, as shown in FIG. 8, when the message of the M_SET service is transmitted from the Ops 605 to the object management software 601 through the Q interface 608 and when the message of the M_ACTION service is transmitted, the object management software 601 issues a write command to the database system 604. The write command defines as targets the instance and the attribute record corresponding to the message of the above described M_SET service in the database stored in the memory 606 or the external storage device 607 managed by the database system 604. The database system 604 updates the above described attribute record in response to the write command, and returns the update result to the object management software 601.

If a predetermined attribute record has been changed and an event ID described later is set for the attribute record, then the change point detection unit 609, forming part of the database system 604, detects the change. If the event ID set for the above described attribute record corresponds to a specific device interfacer 602, then the change point detection unit 609 issues to the device interfacer 602 an event indicating that the above described attribute record has been changed. As a result, the device interfacer 602 issues a read command which defines the above described attribute record as a target to the database system 604, obtains the contents, and sets (for the M_SET service) or controls (for the M_ACTION service) the device 603 depending on the contents.

As a result, when a response is returned from the device 603, the device interfacer 602 issues a write command to the database system 604. The write command defines the instance and the attribute record in the database system 604 corresponding to the above described response as targets. The database system 604 updates the above described attribute record in response to the write command, and the update result is returned to the device interfacer 602.

Thus, when a predetermined attribute record is changed again and an event ID is defined in the attribute record, the change point detection unit 609 detects the change. If the event ID set in the above described attribute record corresponds to a specific object management software 601, then the change point detection unit 609 issues to the object management software 601 an event indicating the above described attribute record has changed. As a result, the object management software 601 issues to the database system 604 a read command in which the above described attribute record is a target, obtains the contents, and returns it to the Ops 605 using the message of the M_EVENT-REPORT service.

Figure 4:
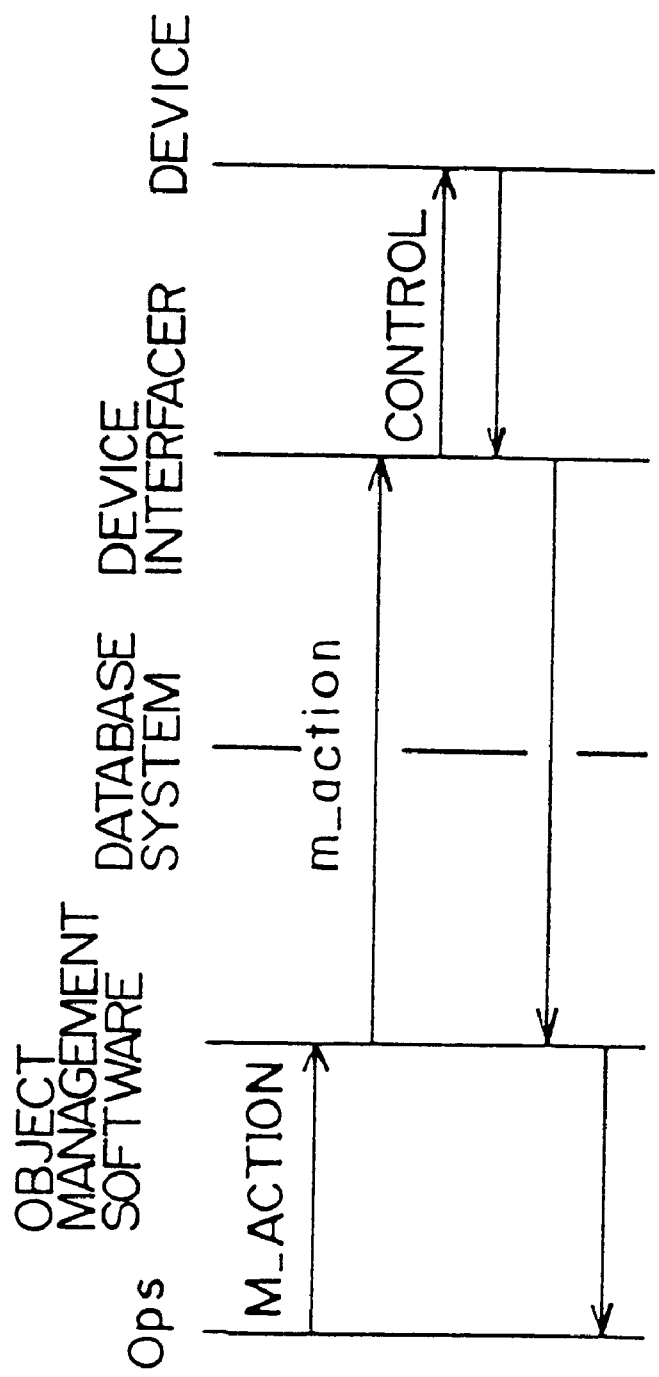
FIG. 4 shows the sequence of the operations of the prior art (controlling the device)

As described above, the object management software 601 only has to issue a simple write command to the database system 604 when the above described A-type attribute data should be updated, when the above described B-type attribute data should be updated, or when the device should be directly controlled without a direct interface (the m_set message shown in FIG. 3 and the m_action message shown in FIG. 4) between the object management software 601 and the device interfacer 602.

Furthermore, when an asynchronous state notification is issued by the device 603 as shown in FIG. 9, the notification is first transmitted to the device interfacer 602. Upon receipt of the notification, the device interfacer 602 issues a write command to the database system 604. The write command defines as targets the instance and attribute record corresponding to the above described state notification in the database. The database system 604 updates the above described attribute record in response to the write command, and returns the update result to the device interfacer 602.

As described above, when a predetermined attribute record is changed again and an event ID is set in the attribute record, the change point detection unit 609 detects the change. If the event ID set in the above described attribute record corresponds to a specific object management software 601, then the change point detection unit 609 issues to the object management software 601 an event indicating that the above described attribute record has changed. As a result, the object management software 601 issues to the database system 604 a read command in which the attribute record is a target, obtains the contents, and transmits them to the Ops 605.

Figure 5:
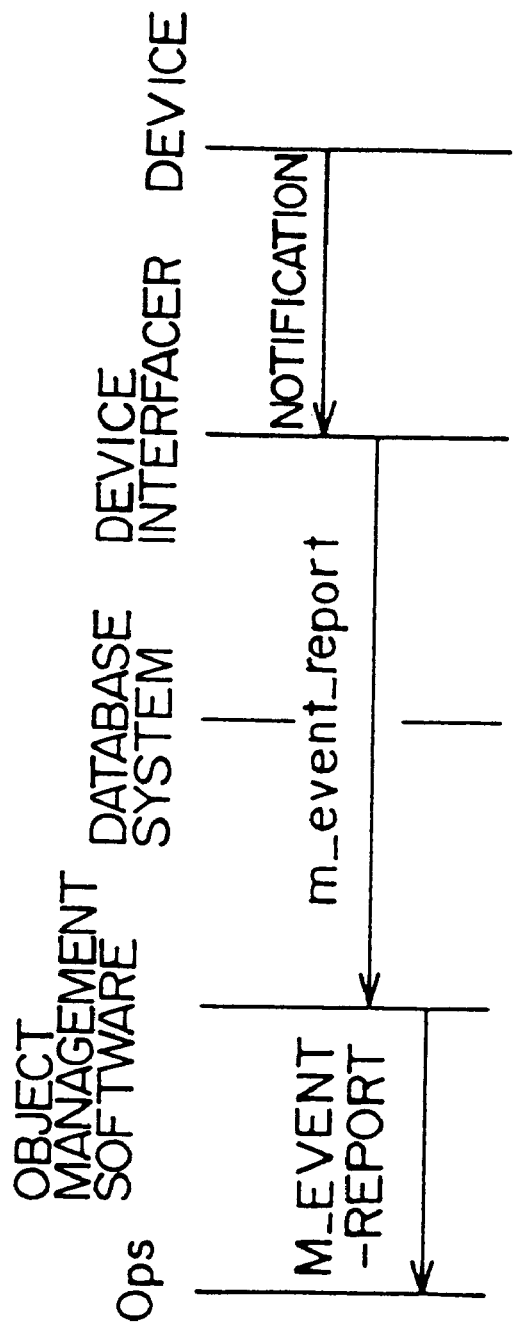
FIG. 5 shows the sequence of the operations of the prior art (an asynchronous notification from the device)

In this case, the object management software 601 only has to issue a simple read command to the database system 604 according to the event notification from the change point detection unit 609, forming part of the database system 604, without a direct interface (m_event_report messages as shown in FIG. 5) between the object management software 601 and the device interfacer 602.

Figure 10:
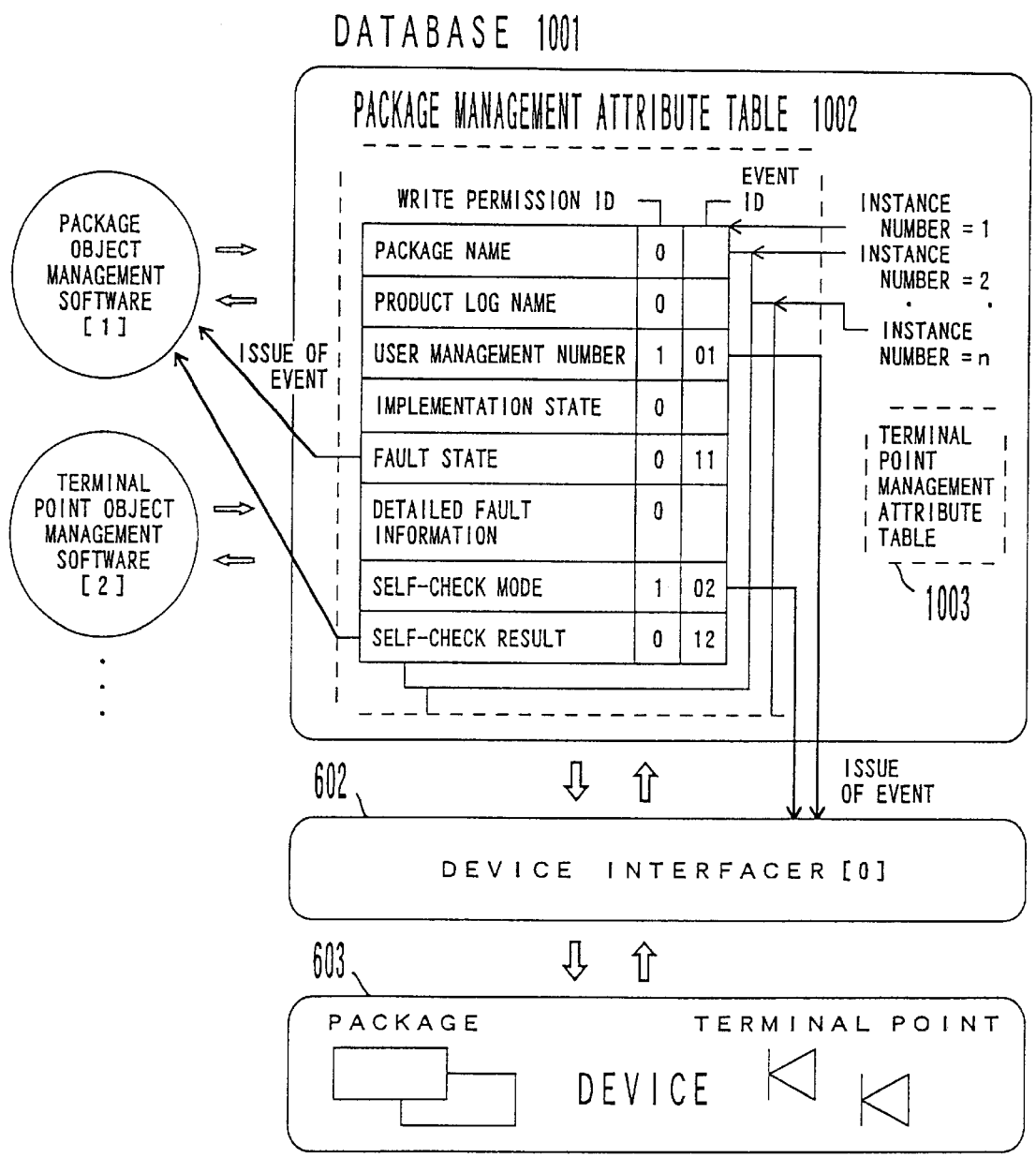
FIG. 10 shows a practical example of the preferred embodiment of the present invention.

FIG. 10 shows an operation of the preferred embodiment of the present invention when a communications device is assumed as a practical example of the device 603.

When the device 603, which is a communications device, is managed by an object-oriented method, an object to be managed can be a function such as a package contained in the device 603, a transmission line terminating point, etc. Each object is managed by a package object management software or a terminating point object management software, that is, an individual object management software 601. In this example, the package management system is described in detail.

An attribute of a package object managed by the package object management software 601 can be, for example, a package name, a product lot number, a user management number, an implementation state, a fault state, a detailed fault information, etc. An operation for the object can be, for example, a self-check. A notification from an object can be, for example, a fault notification and a self-check result. These attributes and operations are entered as attribute records in each instance in, for example, a package management attribute table 1002 stored in the database 1001 managed by the database system 604. Since a notification is regarded as a change in attribute, it is not entered in the database 1001. The database 1001 also stores a terminating point management attribute table 1003, etc.

The attribute record entered in each instance in, for example, the package management attribute table 1002 stored in the database 1001 is assigned a write permission ID as shown in FIG. 10 to permit only the object management software 601 or the device interfacer 602 having the same ID as the write permission ID set in each attribute record to write the attribute record. In the example shown in FIG. 10, the ID of the package object management software 601 is 1. Therefore, the package object management software 601 is permitted to issue a write command to the attribute record 'user management number' and 'self-check mode' in which the write permission ID=1 is set in the package management attribute table 1002 stored in the database 1001. The ID of the device interfacer 602 is 0. Therefore, the device interfacer 602 is permitted to issue a write command to the attribute records, a package name, a product log name, an implementation state, a fault state, a detailed fault information, and a self-check result, in which the write permission ID=0 is set in the package management attribute table 1002 stored in the database 1001.

An event ID is added to the attribute record entered in each instance in, for example, the package management attribute table 1002 stored in the database 1001 as shown in FIG. 10. The change point detection unit 609 shown in FIG. 6 monitors a writing operation to the attribute record to which an event ID is added in the database 1001 managed by the database system 604. When the values of the attribute records are changed by the writing operation, an event having the event ID added to the attribute record is issued. The event ID specifies the object management software 601 or the device interfacer 602 activated by the event, and notifies the activated program of the changed attribute and its instance.

In the event ID=01 added to the attribute record 'user management number' of the instance whose instance number is 1 in the package management attribute table 1002 in the example shown in FIG. 10, the value of the higher order digit 0 indicates that the device interfacer 602 is activated whereas the value of the lower order digit 1 indicates that the value of the attribute record 'user management number' of the instance whose instance number is 1 in the package management attribute table 1002 has been changed.

Similarly, in the event ID=02 added to the attribute record 'self-check mode' of the instance whose instance number is 1 in the package management attribute table 1002, the value of the higher order digit 0 indicates that the device interfacer 602 is activated whereas the value of the lower order digit 2 indicates that the value of the attribute record 'self-check mode' of the instance whose instance number is 1 in the package management attribute table 1002 has been changed.

In the event ID=11 added to the attribute record 'fault state' of the instance whose instance number is 1 in the package management attribute table 1002, the value of the higher order digit 1 indicates that the package object management software 601 is activated whereas the value of the lower order digit 1 indicates that the value of the attribute record 'fault state' of the instance whose instance number is 1 in the package management attribute table 1002 has been changed.

Similarly, in the event ID=12 added to the attribute record 'self-check result' of the instance whose instance number is 1 in the package management attribute table 1002, the value of the higher order digit 1 indicates that the package object management software 601 is activated whereas the value of the lower order digit 2 indicates that the value of the attribute record 'self-check result' of the instance whose instance number is 1 in the package management attribute table 1002 has been changed.

All instances in the package management attribute table 1002 in the database 1001 and all attribute records contained in the instances are stored in the external storage device 607 shown in FIG. 6 and loaded into the memory 606 when the system is initialized. At this time, the function attributes such as a package name, a product lot number, an implementation state, a fault state, a detailed fault information, etc., which are defined in the device 603, should be newly written to a corresponding attribute record in a corresponding instance in the package management attribute table 1002 stored in the database 1001 from the device 603 when the system is initialized. Therefore, the device interfacer 602 updates an attribute record whose ID matches the write permission ID when the system is initialized. Thus, when the system is operated, the package object management software 601 can directly read a specified attribute through the database system 604 even if a read of a function attribute such as an implementation state, etc. of the device 603 itself is specified by the Ops 605 using a message of the M_GET service. The operation sequence is shown in FIG. 7.

For example, when the Ops 605 specifies to set a user management number for a package using a message of the M_SET service, the above described operations are performed by following the sequence shown in FIG. 8.

That is, the package object management software 601 first issues a write command to the database system 604. The write command defines as a target an attribute record 'user management number' in, for example, an instance 1 in the package management attribute table 1002 stored in the database 1001. A write permission ID indicating that a writing operation by the package object management software 601 is permitted is set in the attribute record as shown in FIG. 10. Therefore, the database system 604 can update the above described attribute record 'user management number' in response to the write command.

At this time, as shown in FIG. 10, the event ID=01 indicating a specific device interfacer 602 as a target is added to the attribute record 'user management number'. Therefore, the change point detection unit 609 shown in FIG. 6 issues to the device interfacer 602 an event having the event ID=01 added to the attribute record 'user management number' when the value of the attribute record 'user management number' has been changed in the writing operation. Through this event, the change point detection unit 609, forming part of the database system 604, notifies the device interfacer 602 of the change in the attribute record 'user management number'.

The device interfacer 602 issues a read command, in which the attribute record 'user management number' is a target, to the database system 604, obtains the value, and sets the value in the device 603 managed by the device interfacer 602.

When the device interfacer 602 fails in setting the user management number for the device 603, the device interfacer 602 issues a write command to the database system 604 in response to the answer from the device 603. The write command defines as targets the attribute records 'detailed fault information' and 'fault state' of an instance corresponding to the device interfacer 602 which issued the write command in the package management attribute table 1002 stored in the database 1001. Then, the concrete contents of the 'failure in setting' are written to the attribute record 'detailed fault information', and an error code indicating the failure in setting is written to the attribute record 'fault state'.

The event ID=11 indicating the package object management software 601 as a target is added to the attribute record 'fault state'. The initial value of the attribute record is 'normal'. Therefore, the change point detection unit 609 detects the change in the attribute record, and issues an event indicating the change to the package object management software 601. Through the event, the change point detection unit 609, forming part of the database system 604, notifies the package object management software 601 of the abnormality of the device 603.

As a result, the package object management software 601 issues a read command in which the attribute record 'detailed fault information' is a target to the database system 604, obtains the contents, and returns them to the Ops 605 using the message of the M_EVENT-REPORT service.

When, for example, the Ops 605 issues a request for a self-check of a package using a message of the M_ACTION service, the operation following the sequence shown in FIG. 8 is performed as in the case in which the message of the M_SET service has been issued.

That is, the package object management software 601 issues a write command to the database system 604. The write command defines as a target the attribute record 'self-check mode' in, for example, an instance 1 in the package management attribute table 1002 stored in the database 1001. In this attribute record, a write permission ID indicating that a writing operation by the package object management software 601 is permitted is set as shown in FIG. 10. Therefore, the database system 604 can write a specified mode value in the attribute record 'self-check mode' in response to the write command.

At this time, the event ID=02 indicating a specific device interfacer 602 as a target is added to the attribute record 'self-check mode' as shown in FIG. 10. Therefore, when the value in the attribute record 'self-check mode' is changed in the writing operation, the change point detection unit 609 shown in FIG. 6 issues to the device interfacer 602 an event having the event ID=02 added in the attribute record 'self-check mode'. Through the event, the change point detection unit 609, forming part of the database system 604, indicates a self-check to the device interfacer 602.

The device interfacer 602 issues to the database system 604 a read command in which the attribute record 'self-check mode' is a target, obtains the mode value, and controls the self-check on the device 603 managed by the device interfacer 602 based on the mode value.

Upon completion of the self-check, the device interfacer 602 issues a write command to the database system 604 in response to the self-check result from the device 603. The write command defines as a target the attribute record 'self-check result' in an instance corresponding to the device interfacer 602 which issued the write command in the package management attribute table 1002 stored in the database 1001. A concrete self-check result is written therein.

The event ID=12 indicating the package object management software 601 as a target is added to the attribute record 'self-check result'. The change point detection unit 609 detects a change in the attribute record, and issues an event indicating the change to the package object management software 601. Through the event, the change point detection unit 609, forming part of the database system 604, returns a completion of the self-check in the device 603 to the package object management software 601.

As a result, the package object management software 601 issues to the database system 604 a read command in which the attribute record 'self-check result' is a target, obtains the contents, and returns them to the Ops 605 using the response message of the M_ACTION service.

Simultaneously, the package object management software 601 issues a write command to the database system 604. The write command is used to clear the value of the attribute record 'self-check mode' of the same instance as the attribute record 'self-check result'.

When the value of the attribute record 'self-check mode' changes in the clearing operation, the change point detection unit 609 issues to the device interfacer 602 an event having the event ID=02 added to the attribute record 'self-check mode'.

The device interfacer 602 issues to the database system 604 a read command in which the attribute record 'self-check result' is a target, and clears the contents therein.

As a result, a request for another self-check from the Ops 605 can be accepted in the device 603 managed by the device interfacer 602.

Figure 11:
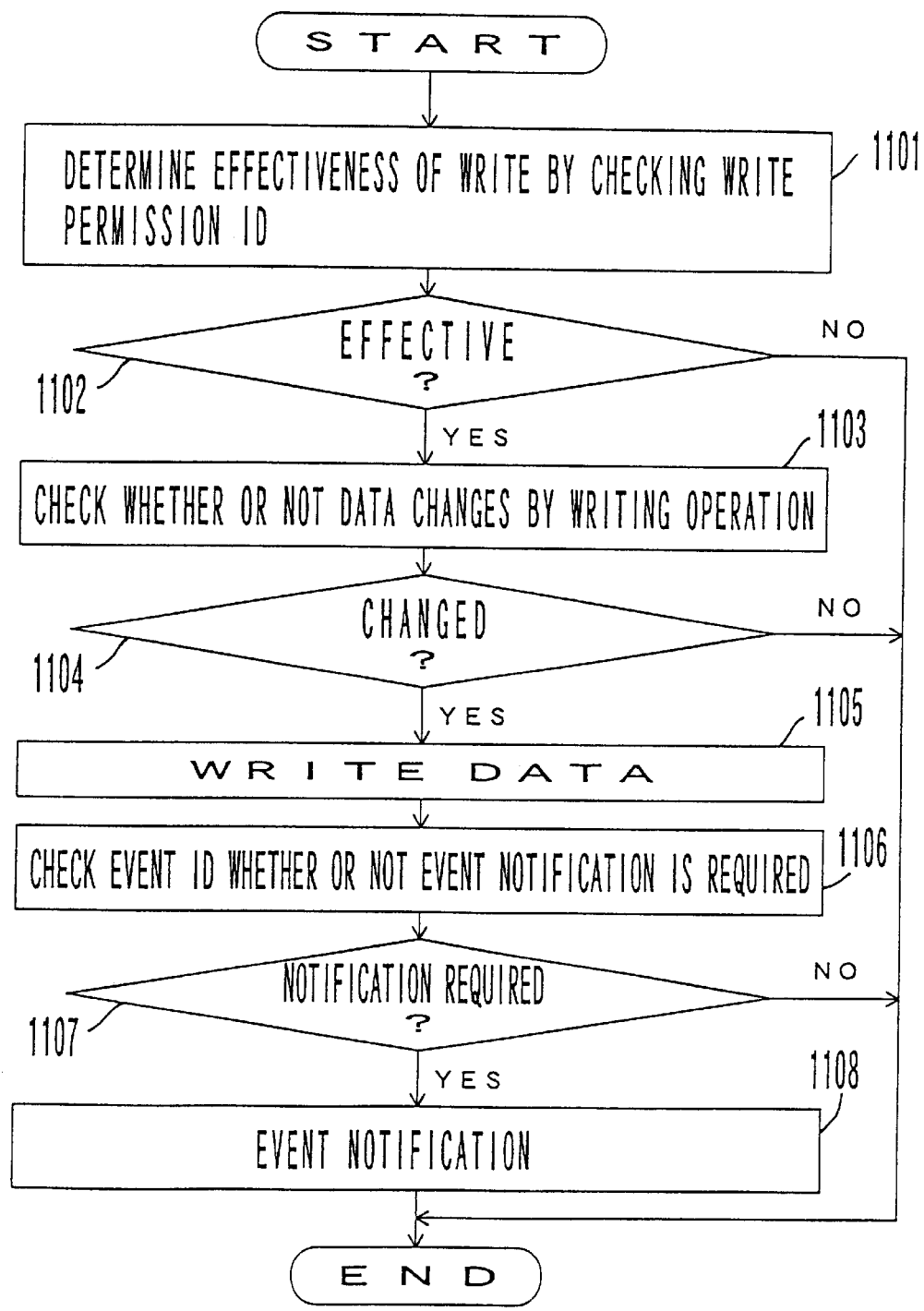
FIG. 11 is a flowchart showing the operation of the database system and the change point detection unit forming part of the system.

FIG. 11 is a flowchart showing the operation of the database system 604 and the change point detection unit 609, forming part of the database system 604, shown in FIG. 6.

First, upon receipt of a write command from the object management software 601 or the device interfacer 602, the database system 604 determines the effectiveness of the writing operation through the write command by checking the write permission ID added to the attribute record defined as a target by the write command (step 1101 in FIG. 11).

When the database system 604 determines that the writing operation by the write command is not effective (determination in step 1102 shown in FIG. 11 is 'NO'), the writing operation is stopped and an error code indicating the unsuccessful write is returned to the source of the write command.

If the database system 604 determines that the writing operation by the write command is effective (determination in step 1102 shown in FIG. 11 is 'YES'), the database system 604 checks whether or not the data of the attribute record indicates a change in the writing operation by comparing the value of the write data specified by the write command with the value of the attribute record which is defined as a target by the write command (step 1103 shown in FIG. 11).

When the database system 604 determines that the data of the attribute record is not changed by the writing operation (determination in step 1104 shown in FIG. 11 is 'NO'), it terminates the writing operation and returns a code indicating a successful write to the source of the write command.

When the database system 604 determines that the data of the attribute record is changed by the writing operation (determination in step 1104 shown in FIG. 11 is 'YES'), it writes a write data specified by the write command to the attribute record (step 1105 shown in FIG. 11).

Then the change point detection unit 609, forming part of the database system 604, checks whether or not an event ID is added to the attribute record, and checks the value of the event ID if it is added (step 1106 shown in FIG. 11).

If the change point detection unit 609 determines as a result of the check that it is not necessary to notify the object management software 601 or the device interfacer 602 of the event (determination in step 1107 shown in FIG. 11 is 'NO'), it terminates a series of the operations and returns a code indicating a successful write to the source of the write command.

If the change point detection unit 609 determines as a result of the check that it is necessary to notify the object management software 601 or the device interfacer 602 of the event (determination in step 1107 shown in FIG. 11 is 'YES'), it issues an event having the event ID added to the attribute record to the object management software 601 or the device interfacer 602 corresponding to the event ID (step 1108 shown in FIG. 11). Then, it terminates a series of the operations, and returns a code indicating a successful write to the source of the write command.

What is claimed is:

1. An object-oriented device management system for managing a device, said device being managed based on function attributes corresponding to the device, said attributes including at least one of a state of said device and management information for setting and controlling said device, comprising:

a database unit storing a function attribute corresponding to the device to be managed as an attribute record, and accessing to the attribute record;

an object management unit connecting to and instructing said database unit to access the attribute record based on an instruction from a user interface concerning the function attribute or based on a first event to be reported to said object management unit, said first event being generated by a change point detection unit;

a device interfacer unit connected to said device and instructing said database unit to access the attribute record based on a change in the function attribute of the device to be managed or based on a second event to be reported to said device interfacer unit said second event being generated by said change point detection unit; and said change point detection unit monitoring a change in the attribute record stored in said database unit, and generating the first event for said object management unit and said second event for said device interfacer unit when changes occur, wherein said object management unit and said device interfacer unit communicate indirectly via said database unit but not directly between said object management unit and said interfacer unit in responding to the first and second event.

2. The system according to claim 1, wherein said attribute record is associated with event information;

said change point detection unit determines an attribute record to be monitored in said database unit according to the event information, determines for which unit the event corresponding to the event information associated with a changed attribute record from said object management unit or said device interfacer unit is directed when the attribute record monitored by said change point detection unit changes, and determines contents of the event according to the event information associated with the changed attribute record.

3. The system according to claim 1, wherein said attribute record is associated with access control information;

said database unit controls, according to access control information associated with an attribute record, access to the attribute record to which is instructed to access by said object management unit or said device interfacer unit.

4. An object-oriented device management method for managing a device based on function attributes corresponding to the device, said attributes including at least one of a state of said device and management information for setting and controlling said device, comprising the steps of:

storing in a database a function attribute corresponding to the device to be managed as an attribute record;

accessing by an object management unit connected to said database the attribute record in said database based on an instruction from a user interface concerning the function attributes or based on a first event reported to said object management unit;

accessing by a device interfacer unit connected to said device the attribute record in said database based on a change in the function attribute of the device to be managed or based on a second event reported to said device interfacer unit; and monitoring changes in the attribute record stored in said database, and generating said first or second event when a change occurs, thereby said object management unit and said device interfacer unit communicate indirectly via said database unit in responding to the first or second event.

5. The method according to claim 4, wherein said attribute record is associated with event information;

an attribute record to be monitored in said database is determined according to the event information, the first or second event is selected corresponding to the event information associated with a changed attribute record when the attribute record changes, and contents of the selected first or second event are determined according to the event information associated with the changed attribute record.

6. The method according to claim 4, wherein said attribute record is associated with access control information; and access to the attribute record in said database is controlled according to access control information associated with the attribute record.

7. A computer-readable storage medium used to direct a computer to perform storing in a database a function attribute corresponding to the computer to be managed as an attribute record;

accessing by an object management unit the attribute record in said database based on an instruction from a user interface concerning the function attribute or based on a first event;

accessing by a device interfacer unit the attribute record in said database based on a change in the function attribute of said computer to be managed or based on a second event; and monitoring changes in the attribute record stored in said database, and generating said first and said second event when changes occur;

thereby said object management unit and said device interfacer unit communicate indirectly via said database unit in responding to the first or second event.

8. The object-oriented device management system according to claim 1, wherein said attribute record includes a self-check mode, which instructs said device interfacer unit to control a self-check for the device to be managed.

said object management unit instructs said database unit to access to the attribute record to initiate said self-check mode.

9. The object-oriented device management method according to claim 4, further comprising the step of:

accessing by said object management unit to the attribute record in said database to initiate a self-check mode, which instructs said device interfacer unit to control a self-check for the device to be managed, when said attribute record includes the self-check mode.

10. The computer-readable storage medium according to claim 7, further to direct the computer to perform the function of:

accessing by said object management unit to the attribute record in said database to initiate a self-check mode, which instructs said device interfacer unit to control a self-check for the computer to be managed, when said attribute record includes the self-check mode.

11. An object-oriented device management system for managing a device based on function attributes corresponding to the device said attributes including at least one of a state of said device and management information for setting and controlling said device, comprising:

database means for storing a function attribute corresponding to the device to be managed as an attribute record, and for accessing the attribute record;

object management means connected to and instructing said database means to access the attribute record based on an instruction from a user interface concerning the function attribute based on a first event to be reported to said object management means, said first event being generated by change point detection means;

device interfacer means connected to said device and instructing said database means to access the attribute record based on a change in the function attribute of the device to be managed or based on a second event to be reported to said device interfacer means, said second event being generated by said change point detection means; and said change point detection means monitoring a change in the attribute record stored in said database means, and generating the first event for said object management means and said second event for said device interfacer means when changes occur, wherein said object management unit and said device interfacer unit communicate indirectly via said database unit in responding to the first or second event.

* * * * *